United States Patent [19]
Bermel

[11] 3,901,178
[45] Aug. 26, 1975

[54] FLUID OPERATED SIGNAL APPARATUS
[75] Inventor: Thomas W. Bermel, Horseheads, N.Y.
[73] Assignee: Corning Glass Works, Corning, N.Y.
[22] Filed: Sept. 14, 1973
[21] Appl. No.: 397,270

[52] U.S. Cl. .................................. 116/70; 137/557
[51] Int. Cl.² ........................................ G01L 19/12
[58] Field of Search .......... 137/557, 834, 835, 836, 137/837; 116/70, 117 R, 151

[56] References Cited
UNITED STATES PATENTS
1,831,407  11/1931  Conklin ........................... 116/151
3,490,408  1/1970  Monge .............................. 116/70

Primary Examiner—S. Clement Swisher
Assistant Examiner—Denis E. Corr
Attorney, Agent, or Firm—Walter S. Zebrowski; Clarence R. Patty, Jr.

[57] ABSTRACT

A fluid operated apparatus providing a signal upon the occurrence of an event. The apparatus comprises a proportional fluid amplifier and a pair of fluid operated means connected to the outlets of such amplifier for providing a fluid stream in response to the occurrence of such event. The apparatus further comprises a means for providing a signal in response to such a fluid stream.

11 Claims, 2 Drawing Figures

PRESSURE DIFFERENCE AT CONTROL NOZZLES OF PROPORTIONAL FLUID AMPLIFIER

FLUID OPERATED SIGNAL APPARATUS

BACKGROUND OF THE INVENTION

A fluid operated apparatus for providing a signal has heretofore been known as seen from a mixer alarm having pressures of the two gases being mixed acting on opposite ends of a piston which is spring loaded to a neutral position to block off a warning whistle. The springs are calibrated so that whenever the difference in source pressures reaches a predetermined level, the higher pressure moves the piston seal past an orifice. The higher gas pressure then vents through the orifice to sound a low pressure warning whistle.

Another prior art device for producing a signal embodies a first and second spring within a housing. A diaphram is affixed to the first spring and a piston is affixed to the second spring. The piston opens or closes a port. When the pressure is within acceptable limits, it is high enough to act on the diaphram and overcome the first spring force. The second spring pushes the piston upwards closing off the port. When the pressure acting on the diaphram falls below a preset value, the first spring overcomes the force exerted by the second spring thereby pushing the piston down to open the port. When the port is open a flow takes place to a reed whistle to sound an audible alarm. However, such known devices have the disadvantages of very low sensitivity and response to a change in pressure. Furthermore, such devices provide a signal or alarm for an excessive decrease in pressure while an excessive increase in pressure produces no signal.

SUMMARY OF THE INVENTION

The objects of the present invention are to provide a simple, direct, and inexpensive fluid operated apparatus which provide a signal upon the occurrence of an event and overcomes the hereinabove noted disadvantages.

Briefly, according to the present invention, a fluid operated apparatus for providing a signal upon the occurrence of an event comprises a proportional fluid amplifier embodying a power stream nozzle, a pair of control nozzles, and a pair of outlets. Also included are a pair of fluid operated means, such as diaphram valves, which are connected to the outlets of the proportional fluid amplifier and which provide a fluid stream in response to the occurrence of said event. A signal means or an alarm is provided so as to provide a signal in respone to such a fluid stream.

Additional objects, features, and advantages of the present invention will become apparent to those skilled in the art from the following detailed description and the attached drawing on which, by way of example, only the preferred embodiment of this invention is illustrated.

DETAILED DESCRIPTION

Figure 1:
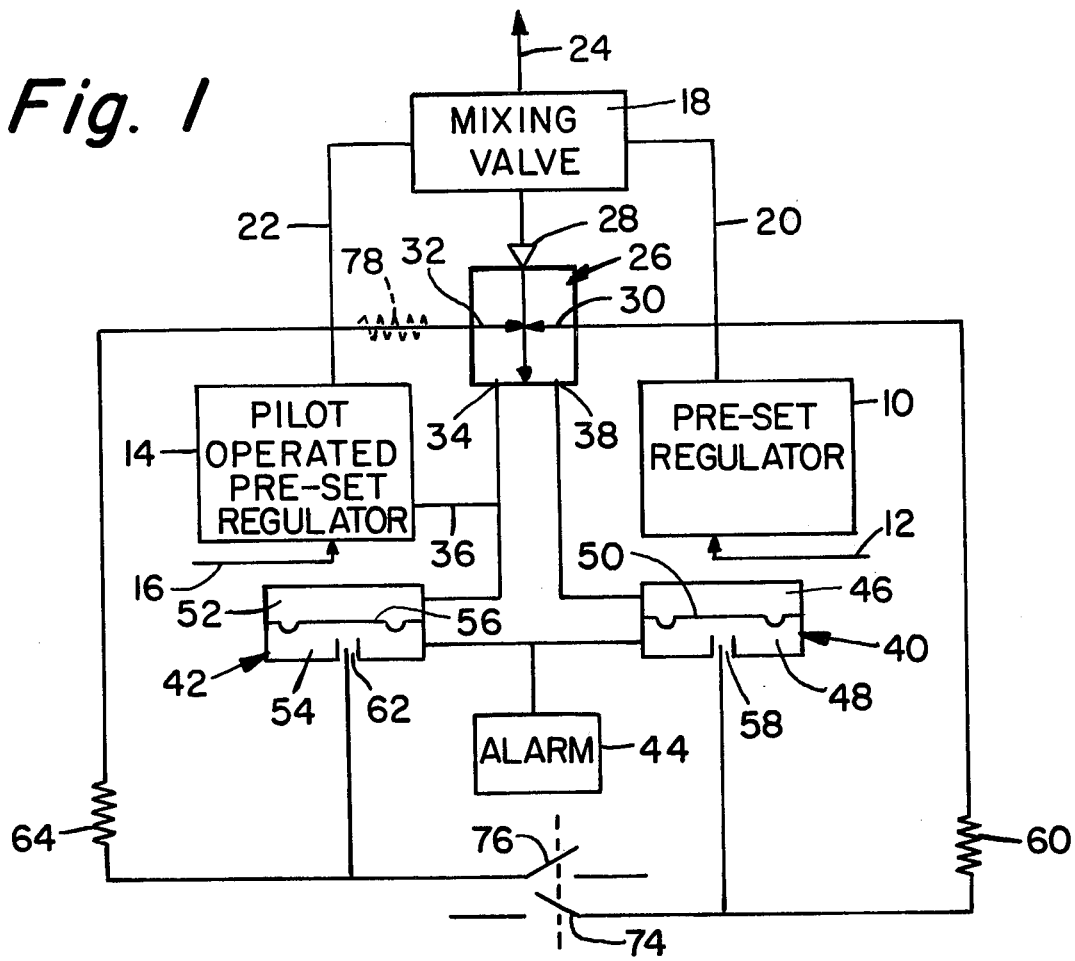
FIG. 1 is a schematic diagram of an apparatus for providing a signal or an alarm in response to a predetermined pressure unbalance between preselected pressures of two fluids being mixed.

It is to be noted that the drawing is illustrative and symbolic of the invention. For the purposes of simplicity, the present invention will be described in connection with an apparatus or system for mixing two gases, the present invention being an apparatus or means for providing a signal or an alarm when the gas mixture varies beyond predetermined limits, however, the present invention is in no way limited thereto, rather is applicable to any apparatus or system where a signal or alarm is desired in response to the occurrence of an event.

By the term fluid as used herein is meant any compressible fluid such as air, nitrogen, or like gases, or incompressible fluid such as water or the like, which fluids may contain solid particles. This invention is not limited to any particular fluid.

FIG. 1 illustrates a two gas mixer, such for example as an air-oxygen mixer. Such a mixer may comprise a pre-set regulator 10 to which is supplied a first gas from a source, not shown, by means of a suitable tube or pipe 12. A second regulator 14 is of a pre-set type which is additionally pilot operated, that is it has a pilot override. A second gas is supplied to regulator 14 from a source, not shown, by means of tube or pipe 16. The outlets of regulators 10 and 14 are connected to a mixing valve 18 by means of tubes or pipes 20 and 22. After the gases are suitably mixed, the gas mixture is emitted at mixing valve outlet 24.

The operation of such a two gas mixer is as follows. The amount of each gas necessary is first calculated to obtain the desired mixture. Thereafter, regulators 10 and 14 are preset so as to provide the proper pressure hence quantity of each of the gases. A proportional fluid amplifier 26 having normally vented outlets is connected to the system so as to provide control over the amounts of gases to be mixed when such amounts vary due to temperature, pressure, and like reasons. A suitable source of fluid is connected to proportional fluid amplifier 26 from a source, not shown, to the power stream nozzle 28. Control nozzle 30 of amplifier 26 is connected to the outlet of regulator 10, while control nozzle 32 is connected to the outlet of regulator 14. Outlet 34 of proportional fluid amplifier 26 is connected to the pilot operation means of regulator 14 by means of tube or pipe 36 to provide a fluid signal to the pilot means to effect the preset pressure override. When the pressures of the gases at the outlets of regulators 10 and 14 remain at a balanced predetermined value, the power stream of proportional fluid amplifier 26 is suitably proportioned between outlets 34 and 38 of proportional fluid amplifier 26. However, for example, if the pressure at the outlet of regulator 10 increases so that the gas emitted therefrom exceeds a predetermined desired volume and the mixture of the gases is thereby unbalanced, more fluid will pass through control nozzle 30 than is desired causing the fluid streams emitted through outlets 34 and 38 of proportional fluid amplifier 26 to become unbalanced and more of the fluid to pass through outlet 34. Such an excess flow through outlet 34 is applied to the pilot operation means of regulator 14 causing it to become adjusted sufficiently so that the amounts of gases emitted from regulators 10 and 14 remain in the desired proportions. If the pressure at the outlet of preset regulator 10 decreases so as to unbalance the gas mixture proportions, less fluid will pass through control nozzle 30 than is desired causing the fluid streams emitted through outlets 34 and 38 to become unbalanced opposite to that described hereinabove, whereby less of the fluid will pass through outlet 34 than is necessary to keep the gas mixture in the predetermined proportions. Such decrease of flow through outlet 34 is similarly applied to the pilot operation means of regulator 14 causing an adjustment thereof opposite to that described hereinabove. If the output pressure of regulator 14 increases or decreases from the predetermined value, the output of proportional fluid amplifier 26 will be affected by the flow through control nozzle 32 in the reverse manner of that hereinabove described, whereby the adjustment of regulator 14 will be effected correspondingly.

It it is desired to be known when the proportions of each gas that is mixed becomes unbalanced beyond a tolerable limit, the apparatus of the present invention will provide a signal or alarm when such event occurs. Such apparatus comprises a pair of diaphram valves 40 and 42 as well as a means for providing a signal or an alarm 44. Diaphragm valve 40 has a pressurizing chamber 46 and a flow control chamber 48 separated by diaphragm 50. Similarly, diaphragm valve 42 has a pressurizing chamber 52 and a flow control chamber 54 separated by diaphragm 56. The pressurizing chamber 46 of diaphragm valve 40 is connected to outlet 38 of proportional fluid amplifier 26 while pressurizing chamber 52 of diaphragm valve 42 is connected to outlet 34 of proportional fluid amplifier 26. Inlet 58 of flow control chamber 48 is connected to the outlet of regulator 10 through fluid resistor 60, while inlet 62 of flow control chamber 54 is connected to the outlet of regulator 14 through fluid resistor 64. The outlets from flow control chambers 48 and 54 are connected to the means for providing a signal or alarm 44. The signal or alarm means may be mechanical, fluid, or electrical means. A typical fluid signal or alarm means may be a whistle, an electrical means may be a transducer operated bell or buzzer, while a mechanical means may be fluidically triggered flag or lever, or the like.

Figure 2:
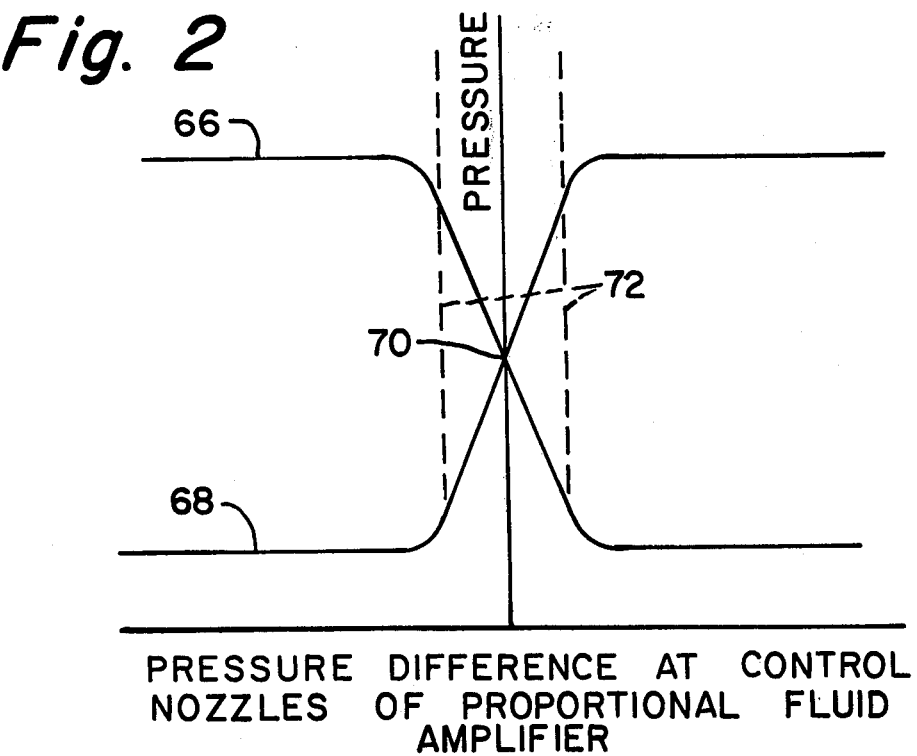
FIG. 2 is a graph of the pressure difference at the control nozzles of a proportional fluid amplifier vs pressure at each outlet thereof.

Referring additionally to FIG. 2, there is shown a graph of the pressures at outlets 34 and 38 of proportional fluid amplifier 26 plotted as a function of the difference in pressures applied to control ports 30 and 32 of proportional fluid amplifier 26. Curve 66 represents the pressure at outlet 34 of proportional fluid amplifier 26 while curve 68 represents the pressure at outlet 38 of proportional fluid amplifier 26. As will be understood, the curves represented in FIG. 2 illustrate the typical outputs of a proportional fluid amplifier. When the pressures at control nozzles 30 and 32 of proportional fluid amplifier 26 are balanced as desired, the pressure difference is zero and the output through outlets 34 and 38 is represented by point 70, that is the desired proportional amount of fluid flows through both outlets. As the pressure at control nozzles 30 and 32 becomes unbalanced, the flow through outlets 34 and 38 become unbalanced as represented by curves 66 and 68 of FIG. 2.

Diaphragm valves 40 and 42 are such that inlets 58 and 62 respectively are closed as long as the pressure at outlets 34 and 38 of the proportional fluid amplifier are balanced or within an acceptable range of unbalance. That is, no flow occurs from the flow control chamber inlets to the flow control chamber outlets under normal conditions.

Dotted lines 72 in FIG. 2 illustrate the limits within which the pressure difference at outlets 34 and 38 and in turn in pressurizing chambers 46 and 52 may vary without a signal or an alarm being given. Within this range of pressure unbalance, the pressure within pressurizing chambers 46 and 52 is sufficient to cause the respective diaphragms 50 and 56 to close off corresponding inlets 58 and 62. For example, if the pressure at control nozzle 30 of proportional fluid amplifier 26 increases, the flow through outlet 34 will increase while the flow through outlet 38 will decrease. Under these conditions, diaphragm 56 of diaphragm valve 42 will cause the flow control chamber inlet 62 to remain closed and no flow will take place to signal or alarm means 44. However, since the flow through outlet 38 of proportional fluid amplifier 26 decreases beyond the limits illustrated by dotted lines 72, the pressure within pressurizing chamber 46 will decrease permitting diaphragm 50 to open inlet 58 of flow chamber 48. When this occurs, a fluid flow takes place from inlet 58 of flow control chamber 48 to the outlet thereof and ultimately to the signal or alarm means 44, whereupon a signal or alarm is then given by means 44. As will be understood, if the pressure at control nozzle 32 increases instead of the pressure at control nozzle 30 the opposite will occur. That is, inlet 58 of flow control chamber 48 will remain closed while inlet 62 of flow control chamber 54 will open permitting flow through flow control chamber 54 to signal or alarm means 44.

It will be understood that the pressure in pressurizing chambers 46 and 52 acts on the large area of diaphragms 50 and 56 respectively, wherefore, a much lower pressure is needed within the pressurizing chambers to maintain inlets 58 and 62 closed. As long as inlets 58 and 62 remain closed, the pressure of the fluid from regulators 10 and 14 acts only on the small area of inlets 58 and 62. When either of inlets 58 and 62 becomes open, the pressure, which theretofore acted only on the small area of the flow control chamber inlet, then acts on the full area of corresponding diaphragm 50 or 56. Accordingly, once either inlet 58 or 62 become open, diaphragm valve 40 and 42 will not close even when the pressure balance between control nozzles 30 and 32 is restored thereby a continuous alarm or signal is given. To reset diaphragm valves 40 and 42 a pair of pressure release valves or switches 74 and 76 are provided. Accordingly, to reset either diaphragm valve 40 or 42, that is close off either inlet 58 or 62, it is necessary to activate reset valves 74 and 76 to bleed the fluid and pressure from the flow control chambers. Once the pressure is released from the flow control chambers, the pressure in the pressurizing chambers will cause the diaphragm to again close off inlets 58 and 62 until another pressure unbalance occurs. Pressure release valves or switches 74 and 76 may be any type of valves which when manually or otherwise activated will open permitting flow therethrough, such for example as, tire valves, or the like. By connecting valves 74 and 76 together, the pressure in both flow control chambers 48 and 54 is simultaneously released resetting both valves regardless of which one may have been opened by the pressure unbalance.

In order to provide the proper level of pressure within the flow control chambers 48 and 54, fluid resistors 60 and 64 are provided for this purpose.

When it is desired to have a mixture of gases where the pressure of one of the gases is substantially disproportionate to the other, a fluid resistor may be placed intermediate the respective gas regulator and the corresponding control nozzle of the proportional fluid amplifier as indicated by dotted resistor 78. In this manner the pressure balance between control nozzles may be substantially maintained while the pressure of each gas supplied may be varied as desired. As will be understood, the amount or volume of each gas mixed is controlled by the mixing valve.

As a typical example of the apparatus of FIG. 1, a proportional fluid amplifier having an amplifier gain of more than 200 is provided. The balanced pressure at control nozzles 30 and 32 may be 40 psig. A typical range of pressure at outlets 34 and 38 of proportional fluid amplifier 26 may be between 1.35 and 3.35 psig. The diaphragm valves may have a diaphragm area of 0.28 square inches while the flow control chamber inlet areas are 0.002 square inches.

It will be readily understood by one familiar with the art, that, although the invention has been described in terms of separate components connected by tubes or members, the apparatus of this invention may be made of integrally formed or molded parts wherein the tubes are merely passages within such parts.

Although the present invention has been described with respect to specific details of certain embodiments thereof, it is not intended that such details be limitations upon the scope of the invention except insofar as set forth in the following claims.

I claim:

1. A fluid operated apparatus comprising
a first pressure regulated source of a first fluid,
a second pressure regulated source of a second fluid,
a proportional fluid amplifier embodying a power stream nozzle, a first control nozzle connected to said first pressure regulated source, a second control nozzle connected to said second pressure regulated source, and first and second outlets for providing at least one fluid stream in response to fluid flow through one or both of said first and second control nozzles,
a source of fluid connected to said power stream nozzle,
a first fluid operated means connected to said second of said outlets of said proportional fluid amplifier, said first fluid operated means being responsive to said first pressure regulated source,
a second fluid operated means connected to said first of said outlets of said proportional fluid amplifier, said second fluid operated means being responsive to said second pressure regulated source, one of said first and second fluid operated means providing a fluid stream in response to a change in pressure in said first or second pressure regulated sources, and
means connected to said first and second fluid operated means for providing a signal in response to said fluid stream.

2. The apparatus of claim 1 wherein each of said first and second fluid operated means is a diaphragm valve.

3. The apparatus of claim 2 further comprising means for resetting said diaphragm valves.

4. The apparatus of claim 3 wherein said reset means is at least one normally closed valve.

5. The apparatus of claim 1 wherein said means for providing a signal is a whistle.

6. The apparatus of claim 1 wherein said means for providing a signal is a bell.

7. A fluid operated apparatus comprising
a first pressure regulated source of a first fluid,
a second pressure regulated source of a second fluid,
a proportional fluid amplifier embodying a power stream nozzle, a first control nozzle connected to said first pressure regulated source, a second control nozzle connected to said second pressure regulated source, and first and second outlets for providing at least one fluid stream in response to fluid flow through one or both of said first and second control nozzles,
a source of fluid connected to said power stream nozzle,
a first diaphragm valve having a pressurizing chamber and a fluid flow control chamber, said pressurizing chamber of said first diaphragm valve being connected to said second outlet of said proportional fluid amplifier, the inlet of said fluid flow control chamber of said first diaphragm valve being connected to said first pressure regulated source,
a second diaphragm valve having a pressurizing chamber and a fluid flow control chamber, said pressurizing chamber of said second diaphragm valve being connected to said first outlet of said proportional fluid amplifier, the inlet of said fluid flow control chamber of said second diaphragm valve being connected to said second pressure regulated source, and
signal means connected to the outlets of said fluid control chambers of said first and second diaphragm valves for providing a signal in response to a predetermined pressure unbalance between preselected pressures of said pressure regulated sources of said first and second fluids.

8. The apparatus of claim 7 further comprising means for resetting said first and second diaphragm valves.

9. The apparatus of claim 8 wherein said reset means is a pair of normally closed valves connected to the inlets of said fluid flow control chambers of said first and second diaphragm valves.

10. The apparatus of claim 7 wherein said signal means is a whistle.

11. The apparatus of claim 7 wherein said signal means is a bell.

* * * * *